United States Patent
Sung et al.

(10) Patent No.: US 7,593,536 B2
(45) Date of Patent: Sep. 22, 2009

(54) MULTIMEDIA AUDIO DOCK

(75) Inventors: Cheng-Hsin Sung, Taipei (TW); Chao-Yang Lin, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 928 days.

(21) Appl. No.: 11/255,916

(22) Filed: Oct. 24, 2005

(65) Prior Publication Data

US 2007/0014426 A1 Jan. 18, 2007

(30) Foreign Application Priority Data

Jul. 13, 2005 (TW) .............................. 94211909 U

(51) Int. Cl.
*H04R 1/02* (2006.01)
(52) U.S. Cl. ....................................... 381/312; 381/387
(58) Field of Classification Search .................. 381/386, 381/387, 388, 390, 395
See application file for complete search history.

(56) References Cited

U.S. PATENT DOCUMENTS 4,388,492 A * 6/1983 Sato ........................... 381/304
D530,310 S * 10/2006 Tsai ........................... D14/215

* cited by examiner

*Primary Examiner*—Walter F Briney, III
(74) *Attorney, Agent, or Firm*—Rabin & Berdo, P.C.

(57) ABSTRACT

A multimedia audio dock is provided to support a portable electronic device so that the portable electronic device can stand on a plane. The multimedia audio dock includes two retractable arms formed by a plurality of sleeved-through tubes so that the length of the two retractable arms can be varied to a predetermined length. A biaxial hinge providing two rotational axes is connected to the two retractable arms, so that the two retractable arms may rotate relative to each other about two rotational axes. Two speakers provided respectively at the ends of the two retractable arms opposite to the ends connected to the biaxial hinge. The speakers receive the audio signals and output sound. And the electronic device is held between the two speakers moved by the two retractable arms, so that the portable electronic device can stand on the plane.

7 Claims, 7 Drawing Sheets

MULTIMEDIA AUDIO DOCK

PRIORITY STATEMENT

This Non-provisional application claims priority under 35 U.S.C. § 119(a) on Patent Application No(s). 94211909 filed in Taiwan on Jul. 13, 2005, the entire contents of which are hereby incorporated by reference.

BACKGROUND OF THE INVENTION

1. Field of Invention

The invention relates to an audio device, and in particular relates to a multimedia audio dock connected to a portable electronic device.

2. Related Art

Presently, portable electronic devices such as personal digital assistants (PDA) or MP3 (MPEG Layer-3) players use earphones to provide audio output. Some models may be provided with miniature built-in speakers, but a single speaker can not provide stereo sound output, and the size is too small to output sufficient power, so that the volume of sound the speaker produces is too low to be heard clearly. Hence built-in speakers are useless in producing effective audio output. Generally, most of the user use earphones to provide audio output for portable electronic devices, or use a large size speaker connected thereto as another audio output device. The size of a conventional speaker is large, so that the speaker is not convenient to be carried or to be kept somewhere. Moreover, it is connected to the portable electronic device by a wire so that it does not fulfill the requirement of portability.

Generally, a personal digital assistant (PDA) may be connected to a dock and be stood on the dock. Meanwhile, the dock provides data syncing and charging for the electronic device. Such a dock does not have multimedia functions and cannot provide audio output for the PDA. Presently, some multimedia players, such as MP3 players, are provided with the dock to add more functions. For example, iPOD and iPOD Shuffle etc. produced by Apple Computer Co., have their dedicated docks. Such a dock is an interface between an MP3 player and a personal computer provide data syncing and charging functions. It may also be provided with a high power speaker so that the audio output of the MP3 player is not limited to the earphones. Yet this type of dock is designed for a certain model of electronic device and may not be used on other models of devices. Furthermore, such a dock is designed to have the shape of a platform, so that it can rest stably on a flat surface. Thus, it has the problems of being too large sized and not convenient to be carried or to be kept somewhere.

SUMMARY OF THE INVENTION

The conventional speaker or dock for the portable electronic device is large sized and not convenient to be carried or to be kept somewhere, so that the audio output performance of the portable device is limited.

In view of the aforesaid problems, the object of the invention is to provide a multimedia audio dock with retractable arms that can rotate about each other and change their length as required, so that the size of the multimedia audio dock can be significantly reduced when not in use. Furthermore, the multimedia audio dock can be matched portable electronic devices of various sizes. Hence the problems of applicability to only a certain model of portable electronic device and being not convenience to be carried are eliminated.

To achieve the aforesaid object, the invention provides a multimedia audio dock that is used to secure and support a portable electronic device, so that the portable electronic device may stand on a flat surface and perform audio output through the multimedia audio dock, thus realizing an integral multimedia audio set. The multimedia audio dock includes two retractable arms formed by a plurality of tubes in a sleeved-through manner. Each of the tubes can slide relative to each other to change the length of the retractable arm. A biaxial hinge with two rotational axis couples the two retractable arms, so that the two retractable arms may rotate about two rotational axes relative to each other. Two speakers are provided respectively on the other ends of the two retractable arms opposite to the ends coupled to the biaxial hinge, to receive the audio signals from a portable electronic device and output sound for audio output. Meanwhile, the two speakers can be moved by the movement of the two retractable arms, and the portable electronic device can be sandwiched and fixed between the two speakers by changing the length of the retractable arms, as such securing and supporting the portable electronic device to stand on a plane.

The major feature of the invention is the combination of the retractable arm and the biaxial hinge, so that the distance between the two speakers can be varied according to actual requirements. In addition, the speakers keep facing forward or a pre-determined direction, so the multimedia audio dock of the invention can be applied on portable electronic devices of various types and sizes, and is no longer restricted to a certain model. Moreover, the design of variable distance between two speakers enables the portable electronic device to be realized in a vertical or lateral arrangement based on the software settings. Hence the portable electronic device can fully utilize the setting of software to fulfill requirements for playing multimedia files or running application programs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below illustration only, and thus are not limitative of the present invention, and wherein.

DETAILED DESCRIPTION OF THE INVENTION

Figure 1:
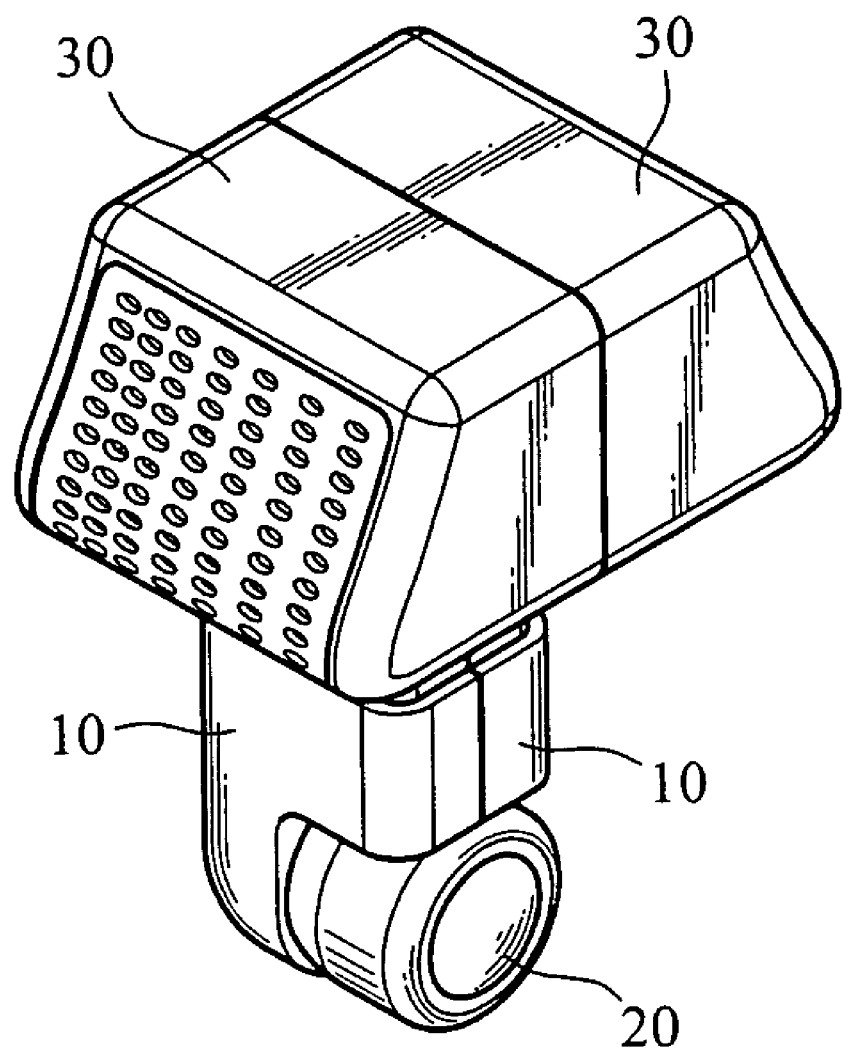
FIG. 1 is a perspective view of a multimedia audio dock of an embodiment of the invention.
Figure 2:
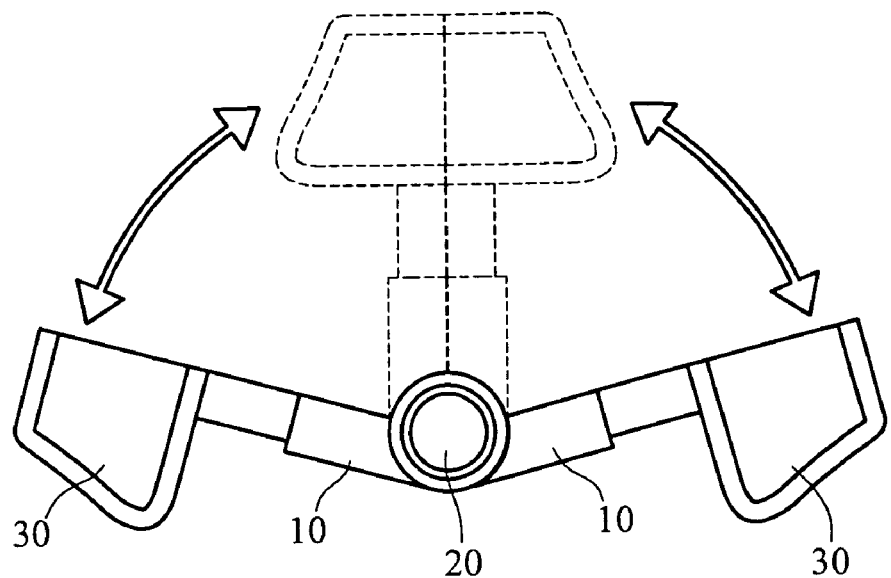
FIGS. 2 to 4 are top views of various implementation configurations of a multimedia audio dock of the embodiment of the invention.

The purpose, construction, features, and functions of the invention can be appreciated and understood more thoroughly through the following detailed description with reference to the attached drawings.

Refer to FIGS. 1 to 4 for an embodiment of the multimedia audio dock of the invention. The multimedia audio dock includes two retractable arms 10, a biaxial hinge 20, and two speakers 30.

The retractable arm 10 is formed by a plurality of tubes in a sleeved-through manner. Each of the tubes can slide relative to each other to a location and then be fixed, so that the retractable arms are realized at a pre-determined length. In this embodiment, two tubes are provided in the each of the retractable arms, wherein the profile of the outer perimeter of one tube 10a is slightly smaller than the profile of the inner perimeter of the other tube 10b, so that they may be in a sleeved-through manner and slide relative to each other to change the length of the retractable arm 10. Moreover, the cross sections of the retractable arms 10 are axially symmetric, so that when the two retractable arms get close together, they form the shape like a single rod.

One end of each of the two retractable arms 10 is connected to a biaxial hinge 20 so that the two retractable arms 10 can rotate about two rotational axes relative to each other. Then the two retractable arms may get together or be separated to form an inclined angle between them. After forming an inclined angle between the two retractable arms 10, they can rotate about another rotational axis to form a different holding configuration.

Two speakers 30 are provided at the free ends of the two retractable arms 10 respectively. The speakers 30 are provided to output sound after receiving audio signals from a portable electronic device.

Figures 3, 4:
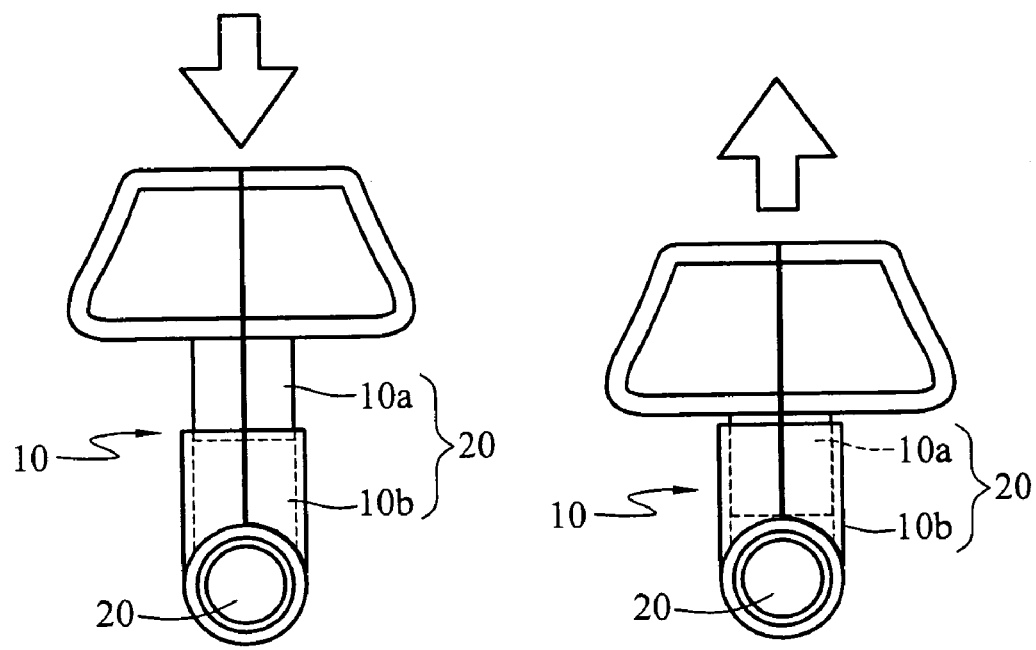

When the multimedia audio dock is not in use, the two retractable arms 10 can be closed to each other with speakers 30, as shown in FIG. 3. Then the retractable arms 10 are retracted to minimum length, as shown in FIG. 4, so that the space it occupies can be reduced to a minimum to be carried or kept somewhere. When in use, the two retractable arms 10 can be separated away from each other, so that the speakers 30 are also moved to be separated away from each other. Then the lengths of the two retractable arms 10 and the inclined angle between them can be varied depending on the actual requirements of the portable electronic device.

Figure 5:
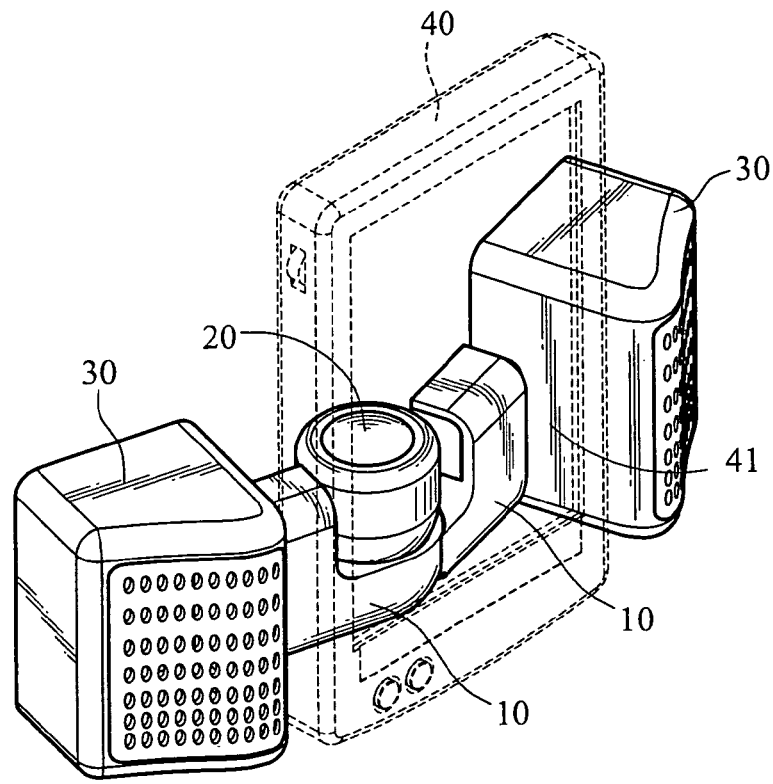
FIGS. 5 to 7 are perspective views of a portable electronic device implemented in the multimedia audio dock of the embodiment of the invention.
Figure 6:
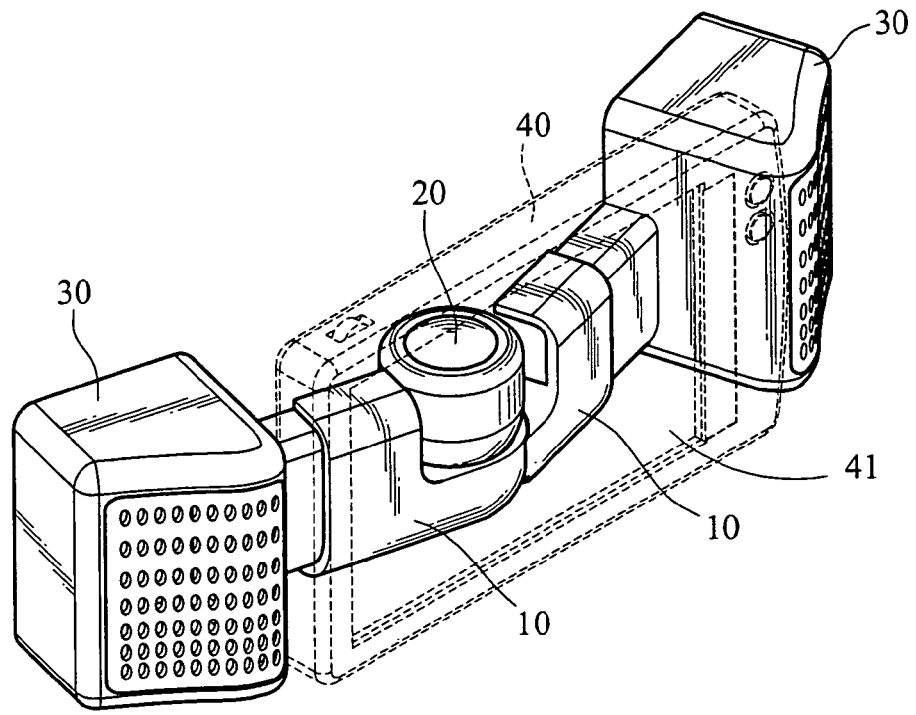
Figure 7:
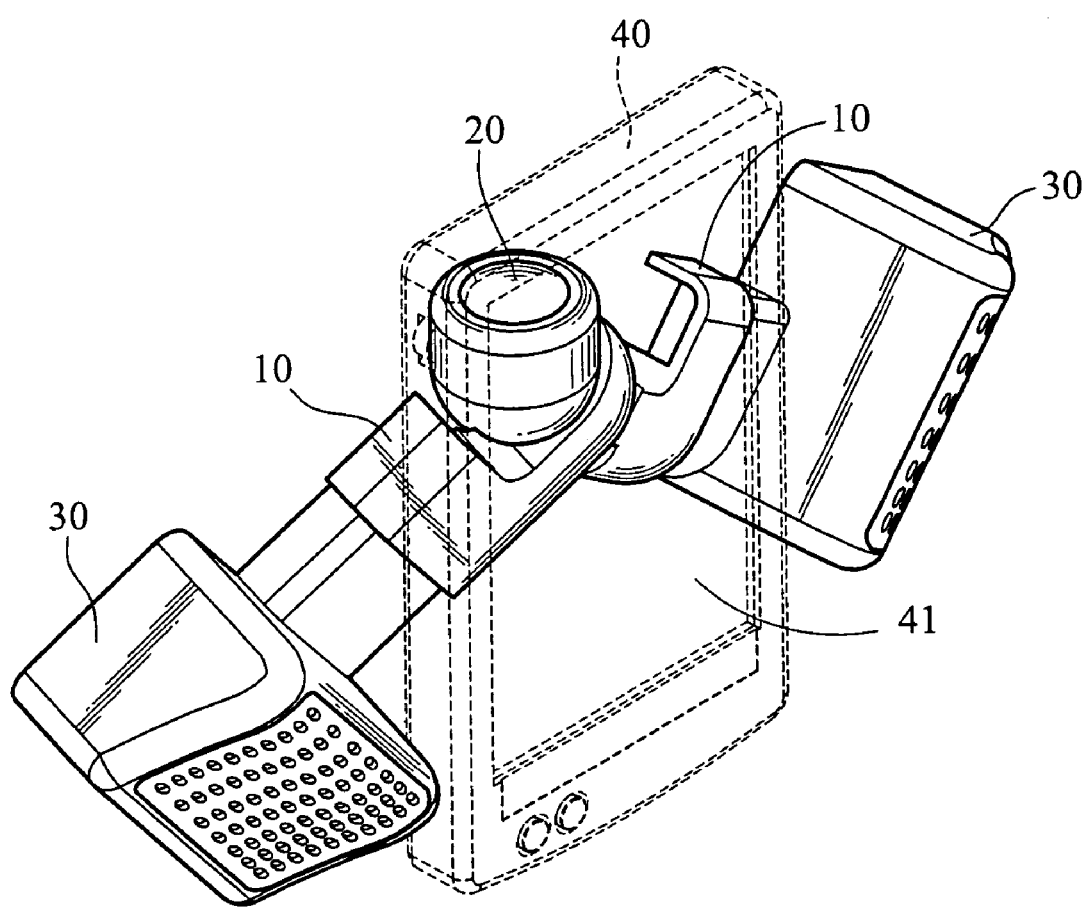

Refer to FIGS. 5 to 7, which show perspective views of a multimedia audio set formed by coupling the multimedia audio dock of the embodiment of the invention to a portable electronic device 40. In FIGS. 5 and 6, the portable electronic devices are arranged in different orientations, while in FIG. 7 the two retractable arms 10 are held in a different angular configuration. In the aforesaid description, the portable electronic device 40 may be a personal digital assistant (PDA), which may serve as a multimedia audio device with running application software, playing movies or music files. Meanwhile, the multimedia audio dock may serve as a support for the portable electronic device 40 standing on a plane, receive audio signals and output sound with the speaker 30, so that the user may listen to music and/or watch movies.

The portable electronic device 40 may be arranged in different configurations under different operation conditions. When playing music, in order that more program information can be displayed on the screen 41 of the portable electronic device 40, it is arranged in a longitudinal configuration. Thus the display screen 41 may have longer length in the longitudinal direction to accommodate and display more program information. As such, the two retractable arms 10 may be separated away from each other to be arranged in a straight line. The portable electronic device 40 may then be put behind them. The lengths of retractable arms 10 can be changed, so that the portable electronic device 40 can be fit into the space thus created with the speakers 30 on its left and right sides respectively as shown in FIG. 5. The portable electronic device 40 is thus supported and is able to stand on a plane. When playing movies, the portable electronic device 40 can be arranged horizontally so that the width of the screen 41 matches the format and width of the images in the movies. As such, the two retractable arms 10 may be separated away from each other to be arranged in a straight line. Meanwhile, the two retractable arms 10 are pulled and extended outward so that the total length of the two retractable arms matches the width of the portable electronic device. Thus the portable electronic device 40 is sandwiched between the two speakers 30, and it may stand on a plane as shown in FIG. 6.

In addition to changing the space between the two speakers 30 for accommodating the portable electronic device by varying the lengths of the two retractable arms 10, the space between two speakers 30 can also be changed by varying the angle between the two retractable arms 10. In order to make the sound of the two speakers to project in the same direction, one end of each of the two retractable arms 10 is connected to the biaxial hinge 20 so that the two retractable arms 10 can rotate about two rotational axes. As shown in FIG. 7, the two retractable arms 10 are separated away from each other to be arranged in a straight line, meanwhile the two speakers 30 are facing the same direction. Then the two retractable arms 10 may rotate about another rotational axis to change the inclined angle between the two retractable arms 10 and the distance between the two speakers 30, but without changing the sound projection directions of the two speakers 30. Thus the two speakers 30 are still facing the same direction and form another holding configuration to support the portable electronic device 40 to stand on a plane. And the two speakers 30 may still face the forward direction of the portable electronic device 40. If the two retractable arms 10 can only rotate about a very single rotational axis, the distance between the two speakers 30 may be changed by varying the angles between the two retractable arms 10. But the directions of the two speakers 30 may face the left and right sides of the portable electronic device 40 respectively, and cannot keep to the sound projected forward. In the embodiment of the invention, the two retractable arms 10 have two degree of freedom in two rotational axes provided by the biaxial hinge.

Figure 8:
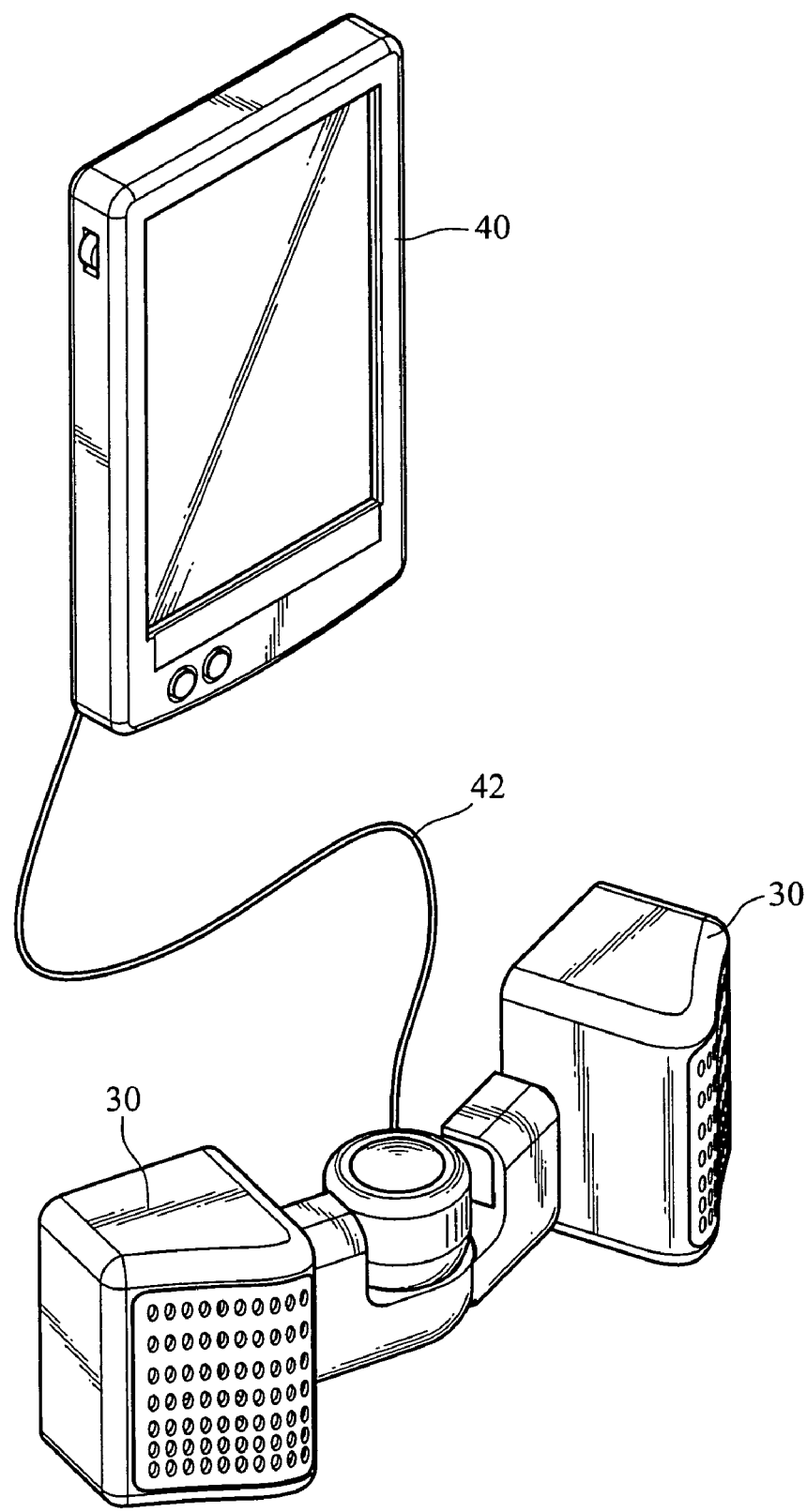
FIG. 8 is a schematic diagram of the configuration of wired signal communication between the multimedia audio dock and the portable electronic device of the embodiment of the invention.

In the aforesaid description, the audio signals are generated by the portable electronic device 40 such as the personal digital assistant (PDA) or MP3 player, and transmitted via a signal wire 42 spilt to the two speakers 30, as shown in FIG. 8.

Figure 9:
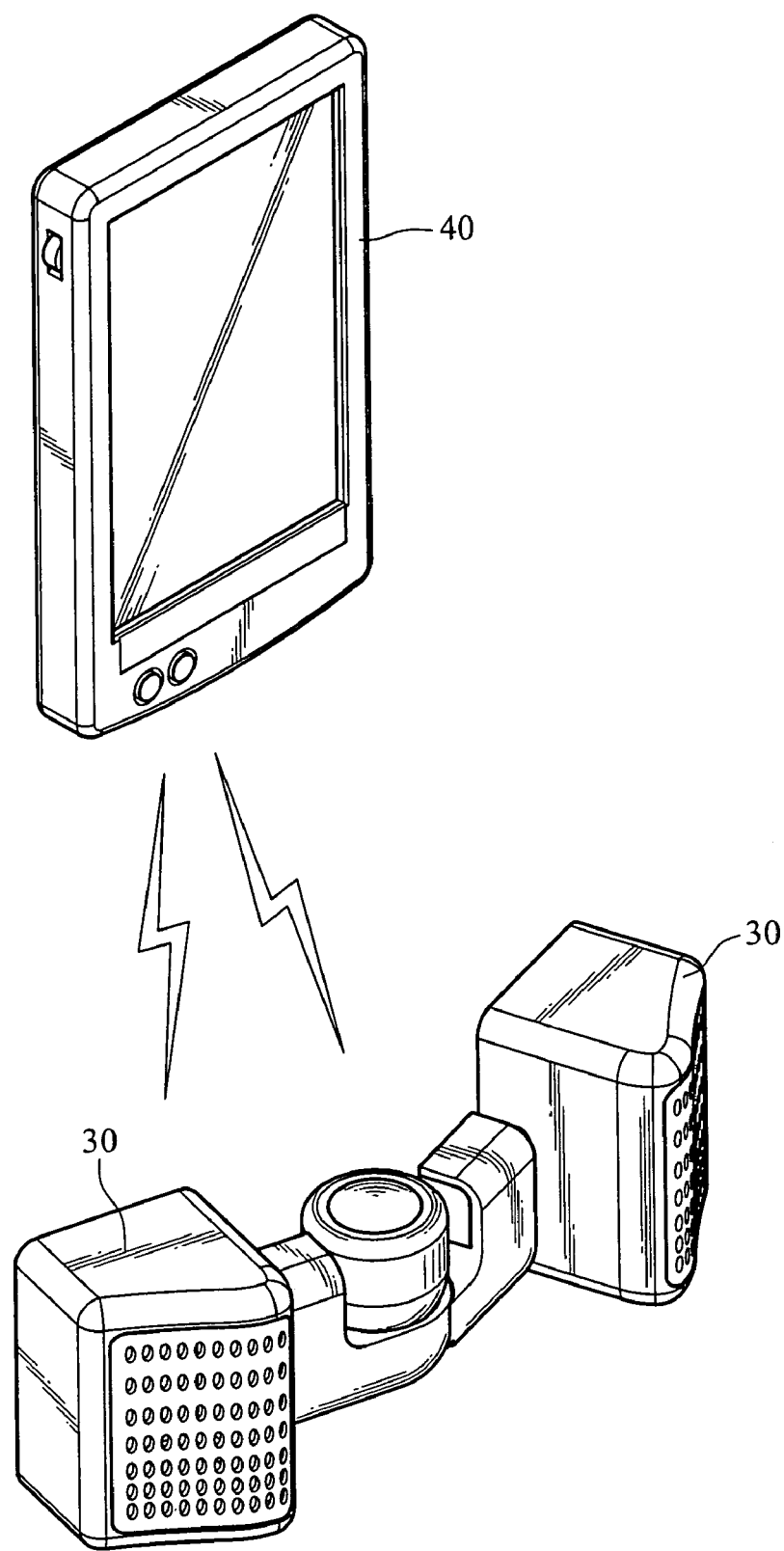
FIG. 9 is a schematic diagram of the configuration of wireless signal communication between the multimedia audio dock and the portable electronic device of the embodiment of the invention.
Figure 10:
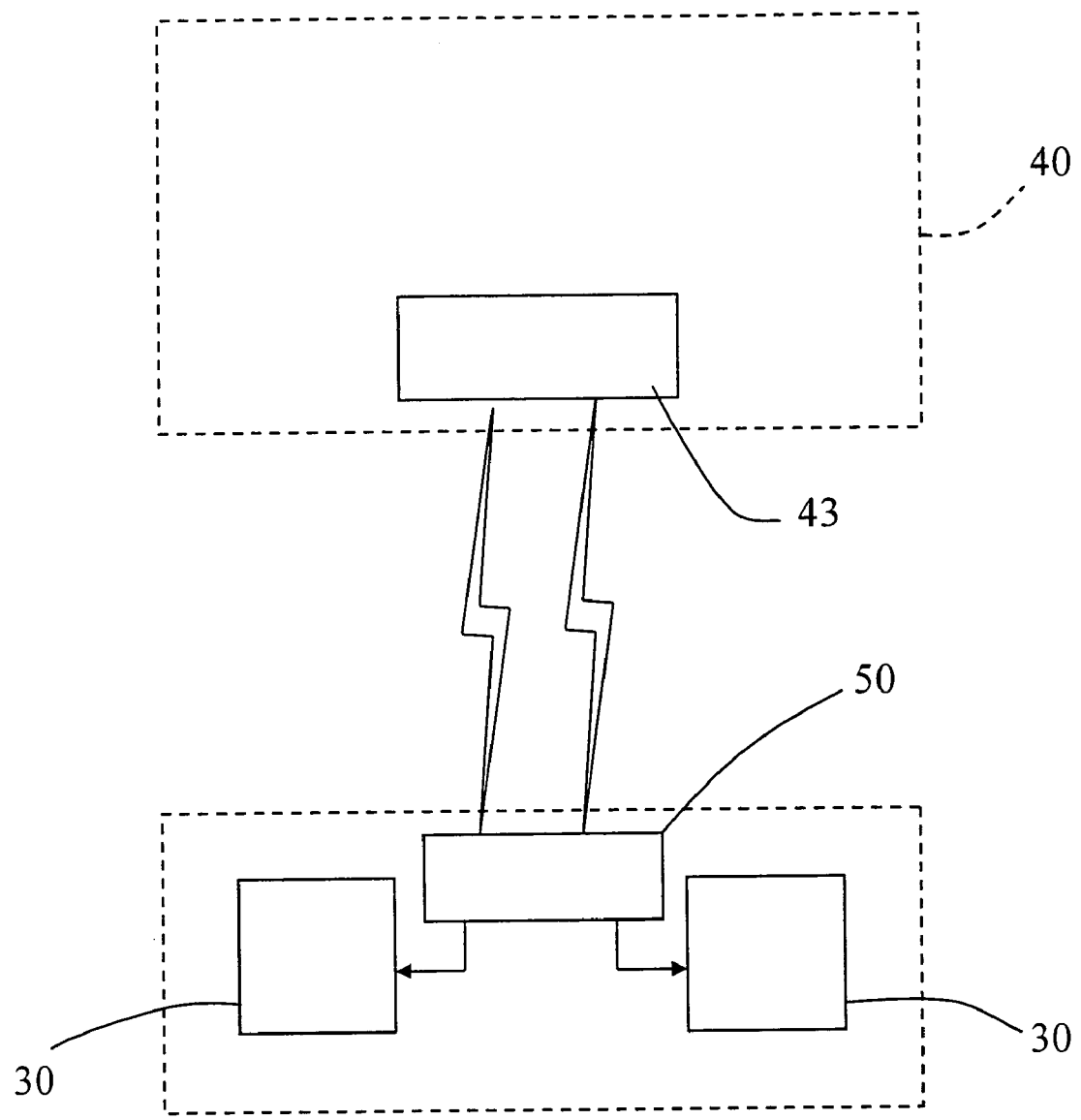
FIG. 10 is a system block diagram of the configuration of wireless signal communication between a multimedia audio dock and a portable electronic device of the embodiment of the invention.

Alternatively, a wireless transmission module 43 may be provided on the portable electronic device 40, and a wireless receiving module 50 may be provided on the multimedia audio dock. Thus audio signals emitted from the wireless transmission module 43 are received at the wireless receiving module 50 by adopting wireless communication technology such as the Bluetooth communication protocol. The audio signals are then input to each of the speakers 30, as shown in FIGS. 9 and 10.

The power required to operate the speakers 30 may be supplied by different types of power sources depending on the types of signal transmission and the operation environment. In the case of wired signal transmission, the power required is supplied by the portable electronic device via the signal wire 42. For example, when the Universal Serial Bus (USB) is used as the signal transmission interface, the power required is transmitted from the portable electronic device 40 to the two speakers 30 through a USB wire. Thus the USB is utilized to provide a electric current and audio signals simultaneously to each of the speakers 30. In the case of wireless signal transmission, batteries can be provided in the speakers 30 to supply the power required. Alternatively, when utilized indoors, a power transformer is connected to the speakers 30 to supply the power required for operation as derived from a household power source.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multimedia audio dock, comprising:
    two retractable arms, formed by a plurality of sleeved-through tubes, that each of the tubes may slide relative to each other to a location, to fix the two retractable arms at a predetermined length;
    a biaxial hinge providing two rotational axes, that one end of each of the two retractable arms is connected to said biaxial hinge and the two retractable arms may rotate relative to each other around the two rotational axes; and
    two speakers provided at the ends of the two retractable arms opposite to the ends connected to said biaxial hinge, to receive audio signals to output sound, wherein a holding space is formed between the two speakers moved by the two retractable arms.

2. The multimedia audio dock of claim 1, wherein each of the retractable arms are formed by two sleeved-through tubes.

3. The multimedia audio dock of claim 1, wherein each of the speakers receives the audio signals via a signal wire.

4. The multimedia audio dock of claim 3, wherein each of the speakers receives a power source via the signal wire.

5. The multimedia audio dock of claim 3, wherein the signal wire is a universal serial bus (USB) wire.

6. The multimedia audio dock of claim 1, wherein each of the speakers has a wireless receiving module to receive the audio signals.

7. The multimedia audio dock of claim 6, wherein the wireless receiving module adopts Bluetooth communications protocol.

\* \* \* \* \*

UNITED STATES PATENT AND TRADEMARK OFFICE
CERTIFICATE OF CORRECTION

PATENT NO. : 7,593,536 B2
APPLICATION NO. : 11/255916
DATED : September 22, 2009
INVENTOR(S) : Sung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this

Twenty-first Day of September, 2010

David J. Kappos
*Director of the United States Patent and Trademark Office*